United States Patent
Duchene et al.

(10) Patent No.: US 8,648,814 B2
(45) Date of Patent: Feb. 11, 2014

(54) DEVICE FOR CONTROLLING HOME AUTOMATION EQUIPMENT OF A BUILDING

(75) Inventors: Isabelle Duchene, Marignier (FR); Luc Marais, Reignier (FR); Jean-Noël Loiseau, La Roche-sur-Foron (FR)

(73) Assignee: Somfy SAS, Cluses (FR)

( * ) Notice: Subject to any disclaimer, the term of this patent is extended or adjusted under 35 U.S.C. 154(b) by 935 days.

(21) Appl. No.: 12/634,717

(22) Filed: Dec. 10, 2009

(65) Prior Publication Data
US 2010/0141602 A1    Jun. 10, 2010

(30) Foreign Application Priority Data
Dec. 10, 2008   (FR) ...................................... 08 06943

(51) Int. Cl.
*G06F 3/00* (2006.01)
*G06F 3/048* (2013.01)

(52) U.S. Cl.
USPC ......................................... 345/173; 715/835

(58) Field of Classification Search
None
See application file for complete search history.

(56) References Cited

U.S. PATENT DOCUMENTS

| | | | |
|---|---|---|---|
| 5,410,326 A | 4/1995 | Goldstein | |
| 6,563,430 B1 | 5/2003 | Kemink et al. | |
| 6,724,409 B1 | 4/2004 | Maddocks et al. | |
| 6,791,467 B1 | 9/2004 | Ben-Ze'ev | |
| 6,885,362 B2 | 4/2005 | Suomela | |
| 6,957,075 B1 | 10/2005 | Iverson | |
| 7,154,478 B2 | 12/2006 | Usuda | |
| 7,379,778 B2 | 5/2008 | Hayes et al. | |
| 7,437,005 B2* | 10/2008 | Drucker et al. | ............... 382/224 |
| 2001/0004717 A1 | 6/2001 | Zhang et al. | |
| 2004/0240395 A1 | 12/2004 | Gauthier et al. | |
| 2005/0257166 A1* | 11/2005 | Tu | ................. 715/787 |
| 2006/0052884 A1 | 3/2006 | Staples et al. | |
| 2006/0069459 A1 | 3/2006 | Retlich | |
| 2006/0112354 A1* | 5/2006 | Park et al. | ..................... 715/835 |
| 2008/0141172 A1 | 6/2008 | Yamamoto et al. | |
| 2008/0270937 A1 | 10/2008 | Poulet et al. | |

FOREIGN PATENT DOCUMENTS

| | | |
|---|---|---|
| DE | 299 12 385 U | 11/1999 |
| EP | 1 527 377 B | 9/2006 |

(Continued)

OTHER PUBLICATIONS

Search report prepared by French Patent Office for priority application FR 08 06943 dated Oct. 2, 2009.

Primary Examiner — Nicholas Lee
(74) Attorney, Agent, or Firm — Frommer Lawrence & Haug LLP; Ronald R. Santucci

(57) ABSTRACT

Device (60; 100) for controlling home automation equipment (1a, 2a, 2b, 2c, 3a, 3b, 4a, 5a) of a building, comprising a display screen (101), in which the screen is assigned to the display of type icons (ITYP1, ITYP2, ITYP3, ITYP4, ITYP5), a type icon representing a set of home automation equipment of one and the same type, the screen also being assigned to the display of location icons (ILOC0, ILOC1, ILOC2, ILOC3, ILOC4, ILOC5), a location icon representing a set of home automation equipment installed in one and the same place in the building, which control device comprises a first selection or navigation means (103, 104, 105, 106) making it possible to position, in a reduced area (98) of the screen, either, a selected type icon or location icon, so as to display on the screen equipment icons (4, 5, 123, 123', 125, 125', 131, 131') representative of the home automation equipment assigned to said selected type icon or location icon.

16 Claims, 4 Drawing Sheets

(56) References Cited

FOREIGN PATENT DOCUMENTS

| WO | WO 01/69332 A | 9/2001 |
| WO | WO 03/007265 A | 1/2003 |
| WO | WO 2006/011271 A | 2/2006 |
| WO | WO 2006/091521 A | 8/2006 |
| WO | WO 2006/092695 A | 9/2006 |
| WO | WO 2008/019113 A | 2/2008 |

* cited by examiner

DEVICE FOR CONTROLLING HOME AUTOMATION EQUIPMENT OF A BUILDING

This application claims priority of French Patent Application Number 08 06943 filed Dec. 10, 2008, the disclosure of which is incorporated herein by reference.

The invention relates to a device for controlling home automation equipment in a building.

The home automation equipment items communicate with the control device via a wireless link for example provided by radiofrequencies. Such equipment items comprise actuators for lighting, heating and air conditioning, natural or forced ventilation, intruder alarms, or even closing or solar protection actuators, manoeuvring moving panels or projection screens, and associated driven products.

Numerous problems are linked to the control of such equipment items that are often at least partly inaccessible and/or not visible, from a control device that is accessible to the user.

In particular, the number of equipment items often imposes grouping by equipment typology (blind actuators, lighting actuators, locking actuators), to perform simultaneous commands, or transmit information to just one type of equipment. However, other groupings are necessary according to the location, for example: all ground floor roller shutters, all south-facing blinds, all equipment (regardless of type) in the living room, etc.

The representation of the equipment items, of their location, of the control commands, raises difficulties in ergonomics and comprehension, both in user mode and in installation mode, and numerous inventions have described these problems and attempted to resolve them, notably using display screens with touch action and simplified icons.

Thus, the U.S. Pat. No. 5,410,326 describes a universal remote control in which one and the same screen can be used to display icons representative of various actions and display messages.

The U.S. Pat. No. 6,791,467 also describes a universal remote control of adaptive type capable of remotely recognizing the various equipment items in the home and displaying on a screen, for example a touch screen, icons representative of such equipment items and their status (for example: "known but out of range"). This universal remote control functionality is preferentially implemented in an existing product of the personal digital assistant (PDA) type. Pressing the touch screen on an icon makes it possible to activate a configuration file, resident in the universal remote control and/or downloaded from the equipment and to display on the screen a representation of the equipment control panel. For the user, giving a command by pressing the image of a button on the control panel then becomes similar to directly pressing on the actual button of the equipment. It is also possible to query the equipment status from the universal remote control, or that a warning signal is sent to the remote control when a particular event occurs in the equipment.

The U.S. Pat. Nos. 6,563,430 and 6,957,075 also described a personal appliance provided with icon and geolocation display means, the display and the functionalities of the appliance depending on its location. In the first case, the location is very fine and the plan of the various rooms in the home can be displayed on the screen. In the U.S. Pat. No. 6,885,362 also the plan of a room with the location of the various equipment items in a room of the home can be accessed on the screen, also with the possibility of showing the hierarchy of the rooms and floors (or grouping of rooms) in the building. In all cases, equipment items can be activated by direct action on its representation in the touch screen. These are representations and means that are still too complex.

Also known are very many means or methods for navigating in drop-down menus or using an icon representation in order to select an action or an equipment item. These means are described in the above documents or even in the U.S. Pat. No. 7,154,478 which provides for a general movement, on a screen, of a global image consisting of a plurality of partial images (equivalent to icons) according to movements undergone by the screen. Everything takes place as if the screen were a transparent window that can be displaced over this plurality of partial images so as to be centred on one of them. The partial images represent home automation equipment items of television, tape recorder, lighting and other types, that can be grouped together, in the form of lists in menus, depending on their location or depending on their function or depending on the frequency of use. A setting screen makes it possible to freely assign a name to the equipment.

In the industrial domain, it is known from US patent application 2006/0069459 to display an installation with icons of "parent" type and icons of "child" type, graphics that can be modified dynamically depending on the status of the installation.

For multimedia applications, also known from the US patent application 2008/0141172 is the use of icons in the form of an animated image.

The U.S. Pat. No. 7,379,778 describes a typical installation configuration comprising numerous equipment items in a home, primarily of multimedia type but also heating or lighting, and numerous control means and methods according to various protocols and using generic commands.

One or more centralized control devices are used, these devices possibly being servers, control modules called "pods", or other, characterized by the use of installation facilities permitted by the "universal plug and play" (UPnP) standard. As described, the installation uses personal computer or Internet resources as local or remote servers. The management of scenarios or "snapshots" is also described in this document.

The patent application WO 2006/092695 describes a control interface for a home automation installation, notably by means of a screen segmented into cells in a matrix fashion. A cell can be assigned by the user or by the installer to a single equipment item, to a group of equipment items or even to a particular command, or finally to a scenario. A simple graphic symbol (square, circle, disc, and triangle) can be displayed in each cell to describe its assignment to a particular type of equipment or command or to describe, for example, the status of the equipment: a white square for open blinds or lamps that are lit, a black square for closed roller shutters or lamps that are off. Alternatively, different colours can be used to indicate status or possibly emphasize storage by using colour codes for different types of commands (equipment item alone, group, scenario) or different spaces in the home (lounge, bedroom, garden). A cursor can be moved on the screen by means of a navigation means, making it possible to select a cell and display a name given to the cell in an auxiliary area of the screen.

Also known from the patent WO 03/007265 and its patent EP 1 527 377 is to facilitate an installation phase requiring the correlation of a physical equipment item with its identifier used in the communication protocol. These procedures remain complex.

Despite the advances made by the devices of the prior art, it is still not very easy for a user, even one familiar with computer techniques, to get to grip simply, intuitively and above all progressively the environment that is extremely rich in possibilities for automation of home equipment.

The user of the devices of the prior art has the option to name the equipment as he wants, but he is unable to assign them simply and understandably, without the slightest abstraction or prioritization effort, to rooms or subsets of the home that are perfectly identifiable at first glance, and do so only when there is a need to do so.

The aim of the invention is to provide a control device that remedies the above drawbacks and improves the methods and devices known from the prior art. In particular, the invention makes it possible to facilitate and make more intuitive the use of a device for controlling a number of home automation elements.

According to the invention, the device for controlling home automation equipment of a building comprises a display screen, in which a first portion of the screen is assigned to the display of type icons, a type icon representing a set of home automation equipment of one and the same type, this first portion also being assigned to the display of location icons, a location icon representing a set of home automation equipment installed in one and the same place in the building such as a room or a group of rooms. It is characterized in that the control device comprises a first selection or navigation means making it possible to position, in a reduced area of the screen, either a selected type icon or a selected location icon, so as to display in a second portion of the screen equipment icons representative of the home automation equipment assigned to said selected type icon or location icon.

The display screen can be a control screen, for example of touch type, the first navigation means being able to recognize a movement of the finger and the first selection means being able to recognize a contact by the finger.

The icons can be arranged on the screen along an open line such as, for example, a segment or an arc of a circle.

The icons can be arranged on the screen by spatially grouping the type icons and by spatially grouping the location icons.

A default location icon can separate the type icons from the other location icons.

Either all the equipment items can be assigned to the default location icon, or only the equipment items not assigned to another location icon can be assigned to the default location icon.

An action on the first navigation means or an action on the first selection means can result in the movement of a set of icons, in particular a movement of the set of type and location icons.

An action on the navigation means or an action on the first selection means can result in the displacement of a selection index and/or the displacement of the reduced area.

An action on the navigation means or an action on the first selection means can result in an appearance and/or a disappearance of an icon.

The second screen portion can comprise a second navigation means and a second selection means acting on the equipment icons.

The selection of an equipment icon can result in the opening of a control window for that equipment item.

An equipment icon can be representative of the status of the equipment.

The device can comprise means for sending a request addressed to the equipment for the equipment to reply with information on their status and means for detecting the transmission of control commands or control command execution information, means for sending a request being activated early when the detection means detects a transmission of a control command or of control command execution information.

The control device may comprise a means of automatic assignment of an equipment item to an equipment type.

According to another aspect of the invention, the device for controlling home automation equipment of a building comprises a display screen, in which a first portion of the screen is assigned to the display of type icons, a type icon representing a set of home automation equipment of one and the same type. It is characterized in that it comprises means for automatically creating and displaying new type icons as new equipment belonging to a new type is recognized in the installation.

The control device comprises hardware and software means that make it possible to govern its operation in accordance with the method of operation that is the subject of the invention. In particular, it comprises hardware and/or software means for successively displaying, in a given area of the screen, a portion of type icon then of a portion of location icon or a portion of location icon then a portion of type icon. The control device can notably comprise a computer program code means suitable for producing steps of the operating method according to the invention, when the program runs on a computer, such as a microcontroller of the control device.

The invention will be better understood on reading the description that follows, given only by way of example and with reference to the appended drawings in which:

FIG. 1 represents a home automation installation 1 comprising several equipment items of five different types.

Figure 1:
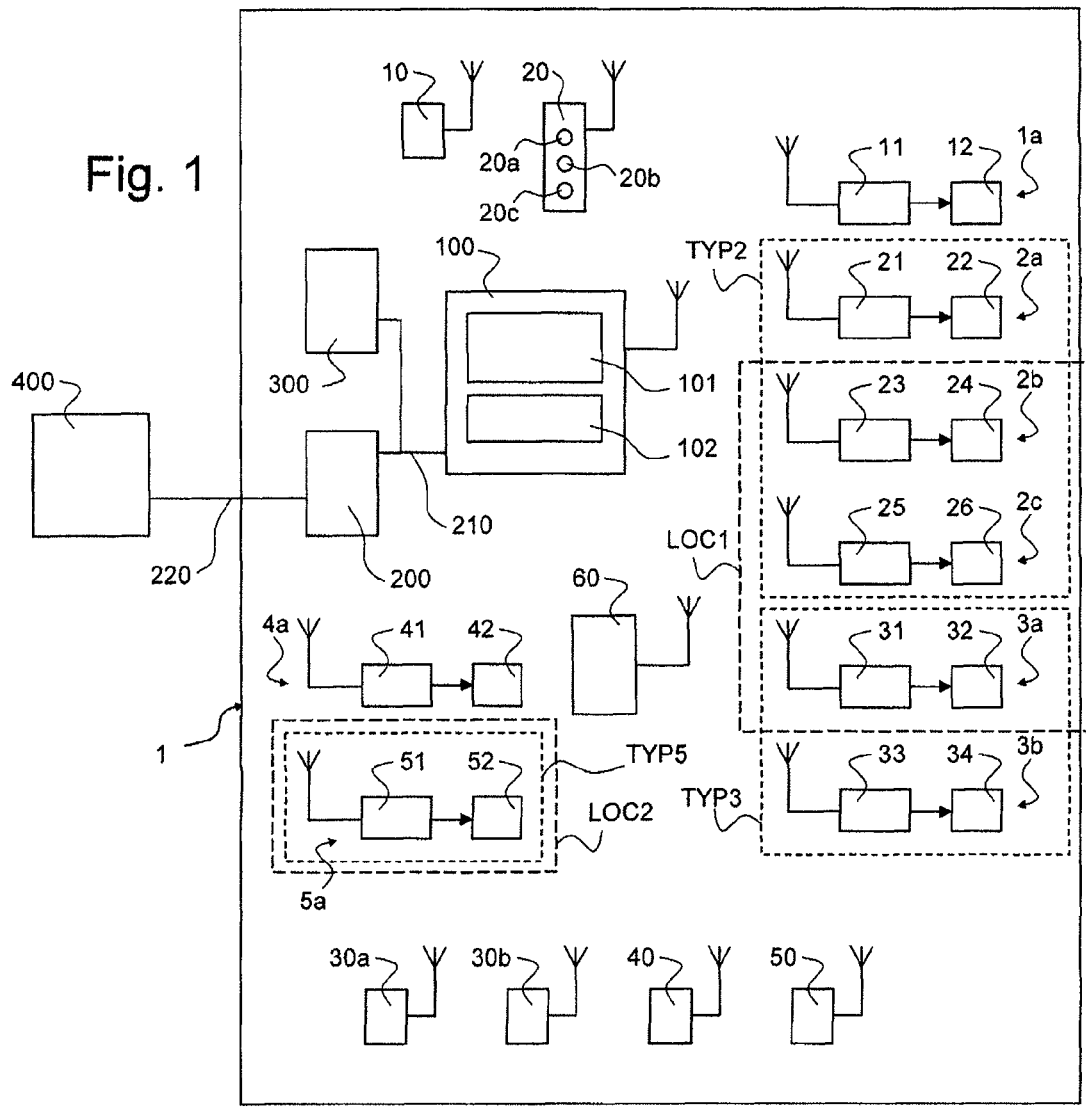
FIG. 1 represents an installation according to the invention.

The equipment items comprise actuators and home automation products on which the actuators act to displace them or activate them. The actuators comprise means of receiving commands by hertzian channel, represented by an antenna. Alternatively, the commands can be transmitted by other communication means, such as powerline communication or infrared-type links.

The first equipment item 1a, of a first type TYP1, is, for example, an actuator 11 driving a terrace awning 12. They can be controlled by a first specific control means 10.

The second equipment items 2a, 2b, 2c, of a second type TYP2, are, for example, actuators for roller shutters 21, 23 and 25 respectively driving the shutters 22, 24 and 26. They can be controlled respectively by keys 20a, 20b and 20c of a second specific control means 20.

The third equipment items 3a and 3b, of a third type TYP3, are, for example, actuators for venetian blinds respectively driving the venetian blinds 32 and 34. They can be controlled respectively by third specific control means 30a and 30b.

The fourth equipment item 4a, of a fourth type TYP4, is, for example, an intrusion alarm unit 41 connected to a siren 42. It can be controlled by a fourth specific control means 40.

The fifth equipment item 5a, of a fifth type TYP5, is, for example, a gate actuator 51, connected to a gate 52. It can be controlled by a fifth specific control means 50.

Other types of equipment items are present in such an installation but not represented by way of examples: gate opener, actuators for locking, natural ventilation, lighting, heating and air conditioning, and the like. A short dotted line referenced TYP2 represents all the equipment of the second type, TYP3 for all the equipment of the third type and TYP5 for equipment of the fifth type. To simplify the figure, this representation has not been applied to the type 1 and type 4 equipment.

The installation 1 also comprises a portable remote control device 60 such as a personal digital assistant (PDA) and a fixed control device 100 such as a wall panel. All the equipments, the remote control device, the fixed control device, intercommunicate by the use of one and the same radiofrequency protocol, for example the io-homecontrol (registered trade mark) protocol. An antenna symbol represents this common communication means. Alternatively, several protocols can be used, with communication gateways or with devices supporting a number of protocols.

The fixed control device is connected to a communication module 200 by a first high speed link 210. This first high speed link is of wired type, for example of Ethernet type, or of radiofrequency type, for example Wi-Fi. The communication module is connected to the world outside the installation 1, and in particular to an Internet server 400, by a second high speed link 220.

A personal computer 300 or a television can be connected to the first or second high speed link.

The fixed control device comprises a control screen 101, preferably comprising a touch control panel, and an electronic unit 99 controlling the screen, comprising other human-machine interface means such as control keyboard, buzzer, loudspeaker, lamps and processing means for the control of the equipment and radiocommunication, as described in the prior art.

The installation as described so far is similar to the installations of the prior art. It is likely to include alternatives described in the prior art. For example the screen 101 can be physically separate from a control module (then called "pod") that would contain all or part of the electronic unit 99. The control screen can be replaced by that of the personal computer 300, or else by that of the personal digital assistant 60. The computer resources used to operate the control module are preferably installed in the latter, but it is also possible to distribute them in whole or in part in the personal computer or in the personal digital assistant or else in the Internet server 400, notably when it concerns databases relating to the configuration of the installation.

FIG. 1 shows equipment groupings corresponding to the equipment locations (real location or as imagined or as required by the user) inside the home or its surroundings.

A first set, designated LOC1, combines the roller shutter actuators 23 and 25 and the venetian blind actuator 31, installed in a first location. This grouping corresponds to products installed in the living room.

A second set, designated LOC2, combines the single gate actuator located in a second location. This grouping corresponds to products installed in the garden. The user could advantageously have included the terrace awning in this garden location, but there is no obligation to do so.

Other groupings have been set up by the user, without being reported on the figure so as not to overload it. For example, the set LOC3 corresponds to the ground floor actuators, whereas the set LOC4 corresponds to the first floor actuators.

By convention, a general set LOC0 combines all the equipment items in the home, whether or not they have been assigned to more precise groupings. Alternatively, this general set LOC0 combines all the equipment items in the home not yet assigned to more precise groupings.

According to the invention, there is a location item ILOC for each location. Thus, a general icon ILOC0 corresponds to the general set, and represents, for example, a home. This is the default location icon. An icon ILOC1 corresponds to the first set, the living room equipment, and is symbolized using a sofa and table to evoke a living room. An icon ILOC2 corresponds to the second set, symbolized using a tree or a flower to designate the equipment in the garden. An icon ILOC3 corresponds to the third set, the ground floor equipment, and is symbolized by a home drawn in fine lines but with the ground floor drawn in bold lines. An icon ILOC4 corresponds to the fourth set, the first floor equipment, and is symbolized by a home drawn in fine lines but with the first floor drawn in bold lines. An alphanumeric text specifies the meaning of the icon, for example "living room" for the first location icon. As will be seen below, the user is free to choose, in a location icon database, those of his choice, and give them the name of his choice.

According to the invention, there is a generic icon or type icon, for each equipment type, in other words to represent a set of equipment comprising one and the same type of actuator and/or one and the same type of associated product. This icon is predefined. In a prior discovery procedure, each equipment item has directly communicated its type to the fixed control device 100, or to another device capable of then transmitting the information to the control device 100. The type of the equipment is, for example, contained in the equipment name originally assigned by the manufacturer of the actuator included in the equipment, for example "RS" or "roller shutter" for a roller shutter actuator, "lock" for a door lock actuator. The equipment also transmits its type icon, or the latter is preferentially predefined within the fixed control device 100, or else downloaded from the Internet server 400.

A type icon according to the invention is not a graphic representation of the home automation equipment in the form of an actuator but a schematic graphic representation of the product that can be activated by the actuator. Preferably, the icon is a graphic representation of the product in a determined status. For example, in the case of a mobile product that can be displaced by the actuator, the icon is a graphic representation of the mobile product in an intermediate position between two extreme positions, notably a middle position.

There is thus a first type icon ITYP1 to represent the actuator equipment for terrace awnings. This icon schematically represents a terrace awning, half deployed.

There is also a second type icon ITYP2 to represent the actuator equipment for roller shutters. This second type icon schematically represents a roller shutter in a half-open position.

There is also a third type icon ITYP3 to represent the actuator equipment for venetian blinds, that is to say blinds with horizontal slats.

There is also a fourth type icon ITYP4 to represent the alarm equipment. In this case, the type icon can represent a siren.

There is finally a fifth type icon ITYP5 to represent the gate motorization home automation equipment. This fifth type icon schematically represents, for example, a gate with two half-open leaves.

There are therefore equipment type icons and location icons. It will be seen later that there is finally, for each equipment item, an equipment icon, representative both of its type and of its status.

Preferentially, an installer has the option to modify the automatic assignment of an equipment item to an equipment type. For example, a tubular actuator normally provided to operate a roller shutter may have been installed by the installer on another product of windable type, for example on a window blind of screen type or on a mosquito screen. A specific menu enables the installer to correct erroneous or imprecise automatic assignments, by choosing a type icon far better suited to the mobile product concerned.

Preferentially, the type icons have one and the same colour for products that have a similar primary function: violet for all closure products, green for solar protection products, yellow for all lighting products, red for all alarm products, etc.

Conversely, all the location icons have one and the same colour, for example sky blue.

There will therefore be several violet coloured type icons, because there are several types of closure products (swinging shutter type, roller shutter type, gate type, garage door type, lock type, etc.), several yellow coloured type icons because there are several types of lighting products (spot type, luminaire type, indirect type, etc.).

Preferably, for each main function a generic function icon is added to the type icons. The generic function icon looks like a type or location icon but without graphics. For example, it simply comprises a rectangle (or another simple figure) filled with the colour selected to express the function. Thus, the "closure" generic function icon represents all the closure products, regardless of their type, in the form of a violet coloured rectangle.

Figure 2:
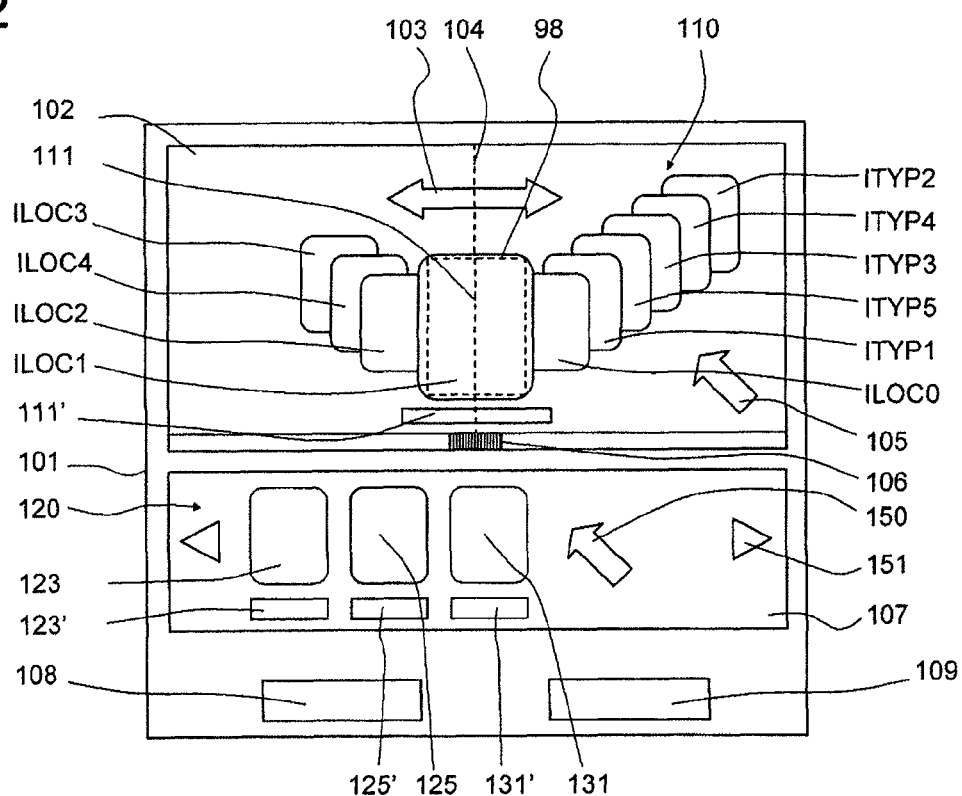
FIG. 2 represents a portion of a control screen.

FIG. 2 represents, at least partly, the control screen 101. A first screen portion 102 shows, or can show, in a display and navigation format 110, all the type icons ITYP and all the location icons ILOC.

The display and navigation format is preferentially a known format displaying image folders or displaying multimedia icons, for example the Apple Cover-Flow format (registered trade marks), as described in FIG. 24 and subsequent in the patent application WO 2008/019113.

This type of format lends itself to display and navigation within a very large number of icons, by reducing the size and/or light intensity of the icons furthest away from a selection area.

A navigation means 103 makes it possible to displace all the icons on an open curve, such as, for example, a horizontal segment or an arc of a circle, with icons disappearing or appearing at each edge of the screen depending on the direction of the action of the user on the navigation means. An active icon 111 appears, for example, highlighted and/or with dimensions greater than all the other icons and/or in the foreground and/or in the horizontal centre of the screen serving as a selection index 104, not necessarily visible. For example, the first location icon ILOC1 is the active icon 111. A displacement of all the icons to the right, using the navigation means 103, successively causes the icons ILOC2, ILOC4 and ILOC3 to become the active icon, in the position occupied by the icon ILOC1 in FIG. 2. When the icon ILOC3 occupies this position, the icon ITYP2 disappears temporarily, for lack of space.

Alternatively, it is the selection index 104 that is displaced under the action of the navigation means, resulting in the highlighting of the new active icon. The two displacement modes can also be combined so as to select the active icon.

Alternatively, the navigation means 103 consists of a direct action on the touch screen, a finger pressure on one of the icons and a horizontal displacement of the latter leading to the displacement of all the icons and/or the displacement of the selection index. The navigation means can also comprise an accelerometer linked to a module containing the screen, the displacement of the icons resulting from a displacement of the module.

FIG. 2 shows a reduced area 98 of the screen used wholly to display an icon. The icon or portion of icon represented in this area may be, depending on the status of operation of the control device, either a type icon or a portion of type icon, or a location icon or a portion of location icon. Thus, there is at least one phase of operation of the control device in which there is, in this area, a transition from a display of a portion of type icon to a display of a portion of location icon or a transition from a display of a portion of location icon to a display of a portion of type icon. The phase of operation mentioned takes place in a routine mode of use of the control device or control mode.

The reduced area 98 can have a fixed position (for example centred on the screen) or can have a mobile position, for example linked to the selection index 104.

The text associated with the selected or active icon appears under the active icon in a text area 105. Preferentially, only the text associated with the active icon is thus displayed, thus constituting the name of the icon.

A scrollbar with cursor 106 makes it possible to display, in the position of the active icon, the width of the cursor representing, for example, the inverse ratio of the number of icons presently displayed and of the total number of icons in the installation.

The cursor 106 can be used not only as display means but also as navigation means, all of the type icons and location icons being displaced to the right or to the left depending on the displacement of the cursor.

Another selection means can be used, for example a pointer such as a first selection arrow 105 that can be displaced with a thumbwheel or mouse connected to the screen. Thus, an icon can be selected by action on this pointer (or else by direct finger action) even if it does not occupy the position of the active icon. However, immediately after a selection action, the selected icon is automatically displaced to occupy a predetermined active icon position, for example in the centre of the screen and/or the selected icon is highlighted and/or the selected icon is placed in the foreground and/or the dimensions of the selected icon are modified.

According to the invention, all the type icons and all the location icons can be displayed in the first screen portion 102, one and the same navigation and/or selection means being used to activate either a type icon or a location icon.

The type icons are created on the screen as new actuators belonging to a new type are recognized in the installation. This so-called discovery process takes place automatically, as described in the prior art, by the interrogation of the equipment that is present and responses from all those that are within range.

In each process of discovering new equipment in the installation, the associated type icon appears automatically in the first screen portion 102, unless other equipment of the same type are already known to the control device, in which case the type icon already exists in the first screen portion and the new equipment item is automatically assigned to this type icon.

The type icon is sought by the control device in a database that is internal or external to the control device, based on type information transmitted by the new equipment. Alternatively, the type icon is transmitted by the new equipment itself.

The type icons are grouped together on the same side of the first screen portion, and preferentially appear in the order of appearance of each new type icon, following the discovery of a new equipment type. Alternatively, this classification can be modified.

The location icons are created on the screen as equipment items are assigned to a new location. The location icons are chosen by the installer or the user from a location icons computer database.

The general location icon ILOC0, or default location icon, is the only one to appear in the first window until the user has created more precise local groupings and chosen the associated location icons. Thereafter, the location icons appear alongside location icons that have already been created, in the order of creation, or alternatively in a modifiable order.

In FIG. 2, it has been assumed that all the groupings of FIG. 1 have been learned by the control system, or made by the installer, in a learning method as described below.

Figure 4:
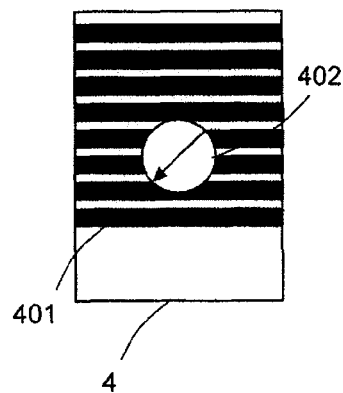
FIG. 4 represents an equipment icon, for a first equipment item.
Figure 5:
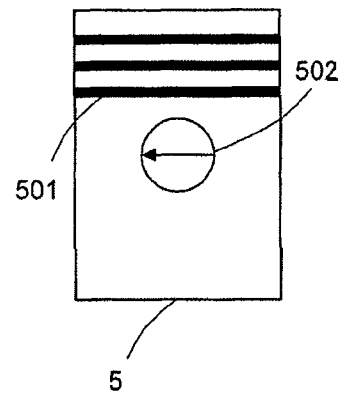
FIG. 5 represents an equipment icon, for a second equipment item.

A second screen portion 107 automatically shows all the equipment icons associated with the selected type icon or location icon. An equipment icon, as detailed in FIGS. 4 and 5, is a representation both of the equipment type and of the status of an equipment item. Since the first location icon ILOC1 (living room) is active, the equipment assigned to this icon by the user appears in the form of equipment icons, namely two roller shutters 23 and 25, therefore two roller shutter equipment icons 123 and 125, and a venetian blind 31, therefore a venetian blind equipment icon 131.

In other words, a type or location icon corresponds to a computer directory or folder gathering a number of equipment icons. The first portion of the screen corresponds to a navigation or browsing window. The second portion of the screen corresponds to a window detailing the content of the directory corresponding to the selected type or location icon. It should be noted that an equipment icon can be associated with a type icon and with one or more location icons. An equipment icon can be considered as a pointer to a computer database containing the characteristics associated with an equipment item.

The text associated with each equipment icon, constituting the equipment name, appears in the second screen portion 107 below each icon, respectively in the text windows 123', 125' and 131'.

Under the second screen portion there is a control area 108, enabling the user to give commands to the selected equipment item, and a status area 109 providing the simplified display of information concerning the status of the selected equipment item. For example, a pictogram indicates in the status area that a command is currently being executed by the equipment.

The control area and/or the status area can also relate to the overall operation of the control device.

A second display and navigation format 120, possibly simpler than the first format, is used: for example, the equipment icons appearing on one and the same horizontal level. A second selection means, of manual type, consists of a pointer such as a mobile selection arrow 150. A second navigation means 151 can be used to scroll the equipment icons if there are too many of them for all to be included in the second screen portion.

Alternatively, a horizontal movement of the finger over the second screen portion drags all the icons together if required, whereas a simple tap on an equipment icon selects the corresponding equipment item.

In FIG. 2, the equipment icon 123 corresponding to the second roller shutter has been selected by the user and appears highlighted relative to the icons 121 and 135.

The act of selecting an equipment icon opens a window for editing characteristics of the equipment and/or makes it possible to open a control window relating to this equipment item and/or makes it possible to select the equipment item to be involved in a scenario, for example by dragging the equipment icon into a scenario grouping window.

Figure 3:
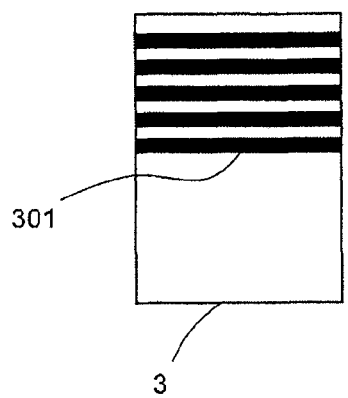
FIG. 3 represents an equipment type icon, also called type icon.

FIG. 3 represents a third type icon according to the invention, representing the set of equipment of "actuators for venetian blinds" type (blinds with horizontal slats).

As described previously, a type icon is a schematic graphic representation not of the actuator itself but of the generic product activated by this actuator. In the case of a mobile product, a type icon is a schematic graphic representation of the mobile product activated by this actuator, preferentially in a middle position 301 of orientation or deployment.

The slats are represented by strips whose colour stands out from the background colour.

FIG. 4 represents an equipment icon 4 according to the invention, for a first equipment item 3a comprising an actuator for a venetian blind. It is, for example, the actuator 31 of FIG. 1. Once again, it is the mobile product that is symbolized and therefore the first venetian blind 32.

An equipment icon looks like a type icon but with one essential difference, at least for the equipment associated with mobile products such as closure or solar protection products. In practice, at least for these mobile products, each equipment icon approximately represents the degree of orientation or of deployment of such products.

Unlike a type icon, common to all the equipment of the same type and therefore fixed, an equipment icon is dynamic and therefore schematically represents:
  the degree of deployment of the first venetian blind, for example by the position of a bottom blind slat 401 relative to the icon,
  the degree of orientation of the first venetian blind, for example by the orientation of an arrow 402 and/or by the proportion of the area of the surfaces of the strips representing the slats versus the area of the surfaces between the strips.

In the case of a venetian blind, a distinction is made between the degree of deployment, linked to the number of slats deployed over the window, and the degree of orientation, the latter being linked to the inclination of the slats relative to the horizontal and being represented in FIG. 4 by a pictogram comprising a variable inclination arrow.

FIG. 5 represents an equipment icon 5 according to the invention, for a second equipment item 3b comprising an actuator for venetian blind. It is, for example, the actuator 33 of FIG. 1, representing the second venetian blind 34 whose degree of deployment 501 is less than the first venetian blind and whose degree of orientation 502 is greater (the slats being closer to horizontal). Alternatively, FIG. 5 could represent the same equipment as FIG. 4, but in a new position of the mobile product.

In FIGS. 4 and 5, degrees of orientation of the slats have been represented by different orientations of arrows 402 and 502 and by different proportions of the areas of the surfaces of the strips representing the slats versus the areas of the surfaces between the strips.

For a sliding gate provided with an access door, it would be possible in the same way to represent the degree of horizontal deployment of the gate and the degree of opening of the door. Other representation are also possible without involving a pictogram but by more finely representing the mobile product and its degrees of freedom. For example, the greater or lesser inclination of the slats can be schematically represented by a slat thickness that is small when the slat is horizontal and great when it is close to the vertical.

For other product types, for example a simple roller shutter, the degree of deployment is sufficient, and an equipment icon then schematically represents the apron of the roller shutter, more or less unwound.

Figure 6:
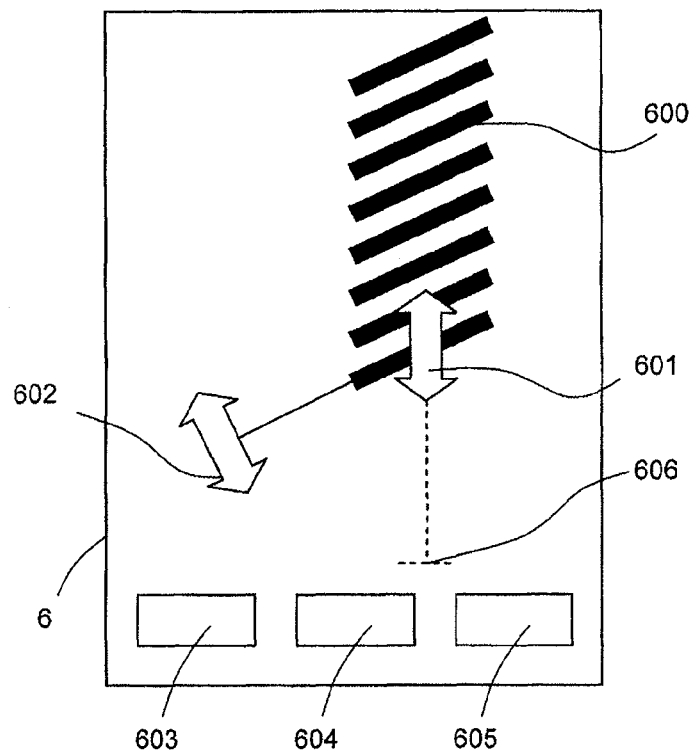
FIG. 6 represents a control window.

When the user selects an equipment icon, a control window for said equipment is then opened, as represented by the control window 6 of FIG. 6. For example, the control window 6 appears on the screen by selecting the equipment icon 4, by pressing the finger on this equipment icon.

Preferentially, this control window then temporarily covers a portion of the screen, in the form of an overlaid window, called "pop-up", unless this screen is big enough to be able to permanently assign an area of the screen to the display of the control windows. Alternatively, the control window simply replaces the first portion and/or the second portion of the screen.

The control window schematically represents the mobile product, possibly in a second graphic representation different from the first graphic representation used in the equipment icon.

A venetian blind representation 600 appears, this time in cross section, with a button for setting the degree of deployment 601 and a button for setting the degree of orientation 602. Each setting button has, for example, the form of an arrow or a double arrow. These setting buttons constitute means of transforming or modifying the appearance of the representation of the mobile product.

If the user places his finger on the setting button 601 and drags his finger downward, then the image 600 is modified so as to show a greater deployment (the appearance of new slats), and vice versa in the case of an upward movement of the finger. If the user places his finger on the setting button 602 and drags it upward or downward, this has the effect of modifying, in the image 600, the inclination of the slats towards the horizontal or towards the vertical.

Preferentially, the deployment or orientation setting end stops 606 are indicated, as is a graduation, and a numerical display of the percentage or other value representing the degree of orientation and the degree of deployment, for example: "angle=45°" and "deployment=80%".

When the user has modified the degree of orientation and/or the degree of employment as required, he acts on a first control button 603, which causes a control command to be sent only to the selected equipment item, or on a second control button 604 which causes a control command to be sent to all the equipment items of the same type and same location as the selected equipment item, or on a third control button 605 which causes a control command to be sent to all the equipment of the same type as the selected equipment item, regardless of location. In all cases, the control command is such that it contains the necessary commands for the equipment to assume the degree of deployment and/or orientation displayed by the control window.

Preferentially, the control window is closed automatically upon action on a control button or upon the execution of the control command.

The equipment icon is automatically updated by graphic adjustment when the control command is executed. If the command is applied to a number of equipment items, the update affects all the equipment icons for these equipment items.

An indicator, for example a dynamic indicator animated by blinking, or by rotation, indicates that a command is currently being transmitted and/or currently being executed and/or that the second representation of the equipment or the icon is not yet updated, that is to say representative of the current status of the equipment.

Thanks to the method of operation according to the invention, and in particular thanks to the mode of execution of the method that has just been described, an icon representing a home automation equipment item is representative of its status and notably of an intermediate status between two extreme status. It is in practice important for an equipment icon to be representative of the equipment itself and not of a control panel for said equipment. This is particularly true when the equipment item is a motorized closure or solar protection product in a building: a garage door or gate, terrace awning, venetian type blind, roller shutter actuator. In this case, it is the final product that must be represented on the equipment icon and the action on the equipment icon must cause a modification to it similar to that of the final product, serving as the setpoint and serving to transmit a command to the equipment. It is thus possible at first glance to have a view, at least approximate, of the status of orientation and/or of total or partial deployment of a number of motorized closure or solar protection products, simply by selecting a type icon or a location icon.

Figure 7:
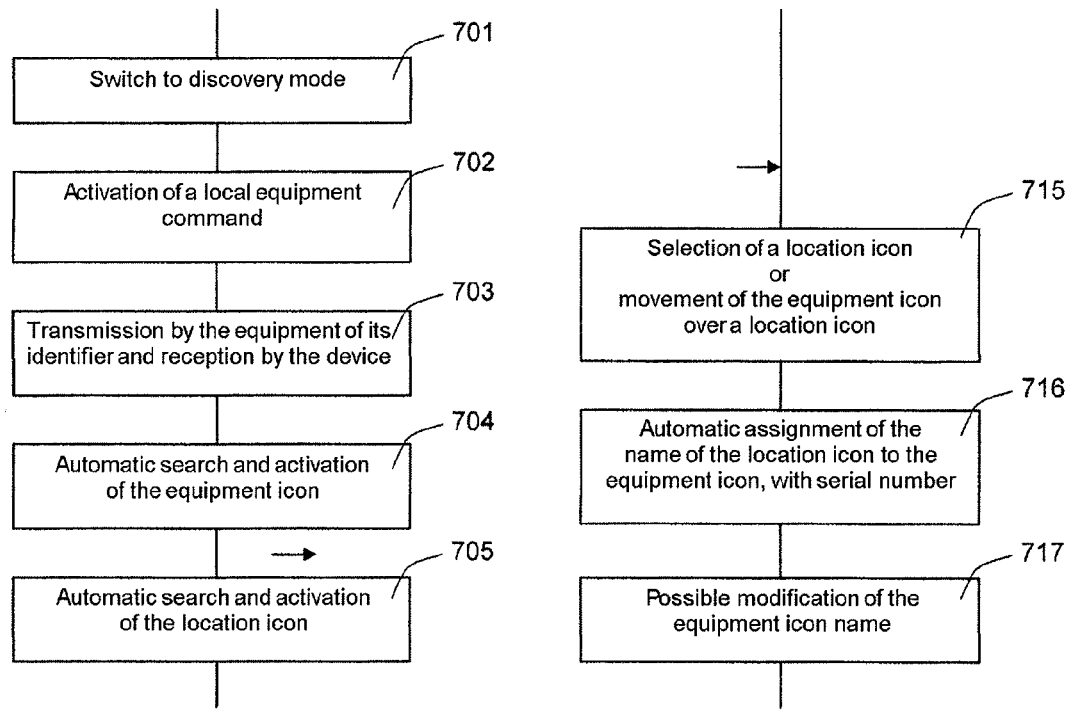
FIG. 7 represents a discovery method and an alternative of this method.

FIG. 7 represents a mode of executing a learning method of a control device according to the invention that has a discovery mode.

In a first step 701, a discovery mode is selected, by action on the part of the user on the control device, for example a specific press on the control area 108. In the discovery mode, the control device broadcasts a specific discovery signal to all the equipment items. The equipment items then switch to discovery mode and the control device awaits the receipt of information.

In a second step 702, the installer acts on a control means specific to an equipment item, for example the specific control means 20c for the actuator 25 contained in the equipment item 2c. This second step can include the preliminary display of a message prompting the installer to act on an equipment item of his choice.

Following this action, the equipment reacts with a sensitive signal intended for the installer, for example a brief to and fro movement, and above all sends, in a third step 703, a message to the control device to inform it that it has just been activated. This message contains an identifier of the equipment item.

On receiving this identifier, the control device automatically searches for and selects the corresponding equipment icon, that is to say the equipment icon 125 and the equipment name 125' corresponding to the actuator 25.

If it is a first pairing, the equipment icon may be replaced by the type icon, because the equipment is not necessarily able to transmit information on the degree of orientation and/or the degree of deployment.

On a first pairing step, the text window 125' associated with the equipment icon 125 contains an original text, for example "roller shutter # 286945". This text, for example set by the manufacturer of the actuator, can immediately be modified by the installer (or the user) who knows unambiguously which product he has just activated using the control means. The text window is therefore updated, for example "roller shutter, west living room", using specific controls in the control area 108, making it possible for example to open an input window in the form of an alphanumeric keyboard.

Thus, the equipment becomes perfectly identified.

If it is a first pairing, the equipment is assigned only to the general location icon ILOC0, which automatically becomes selected. However, if the same operation is performed when an assignment of the equipment to a location icon has already been done, then it is this location icon that is automatically selected, for example the "living room" icon ILOC1 in the case of the equipment item 25.

From any initial configuration, and following the switch to discovery mode and the activation of the control means 26, the screen then appears in the configuration of FIG. 2 with the equipment icon 125 and the location icon ILOC1 automatically selected.

If the equipment is assigned to a number of location icons, an indicator informs the user of this in the status area 109. Simply activating control area 108 allows switching from a first location icon comprising the equipment item to a second location icon comprising the equipment item, so as to see or eventually to modify the assignment.

The link between equipment icon and actual equipment item is therefore very easy to establish by using this method. This method replaces or complements effectively the methods known from the prior art.

Thanks to the inventive method, and in particular thanks to the mode of execution of the method that has just been described, a direct action on the equipment (or on a specific control means associated with the latter) enables it to be immediately identified on a display screen, at least in terms of equipment type and possibly in terms of location, either also being modifiable if necessary.

FIG. 7 shows, in its right hand part, an alternative of the method, replacing the fifth step 705.

This alternative deals with the assignment of a location to the equipment whose equipment icon has just been activated in the fourth step 704.

In a first alternative step 715, the installer selects a location icon from the set of location icons, while the equipment icon is active, or alternatively, the installer drags the equipment icon towards a location icon until it meets the latter.

In a second alternative step 716, one or other of the preceding operations results in the equipment being assigned to the grouping represented by the location icon.

A new name for the equipment icon is then automatically generated, according to an equipment name format, incorporating all or part of the name of the location icon, and a serial number.

For example, in the step 704, the selected equipment item is represented by an icon bearing the name "roller shutter # 286945".

In the first alternative step 715, the installer or the user drags the equipment icon over the "living room" location icon ILOC1. Immediately, the name of the equipment icon becomes "living room roller shutter 2", the name of the location icon and a serial number replacing the manufacturer reference or the original specific code of the equipment icon. If the equipment is the only equipment item of the same type in the grouping, then the serial number does not appear in the name. This number automatically becomes 1 as soon as a second equipment item of the same type appears which then takes the number 2, and so on. If the shutter has been previously renamed by the user "roller shutter west" for example, this step makes it possible to automatically modify this name by the addition of the name of the location item. The name of the equipment icon becomes "roller shutter west living room".

In a third alternative step 717, the user or the installer can modify the name automatically assigned in the preceding step.

An equipment item whose name has been modified in a grouping automatically has this name modified in the higher level groupings. For example, the preceding equipment is also called "living room roller shutter 2" when it is displayed from the default location icon ILOC0 or when it is displayed from the type icon ITYP2, "roller shutter".

This alternative can also be applied even when the selection of the equipment icon is made without using the steps 701 to 704 of the method, for example when the equipment icon is selected using the second selection means 150 or when another discovery method is used.

Figure 8:
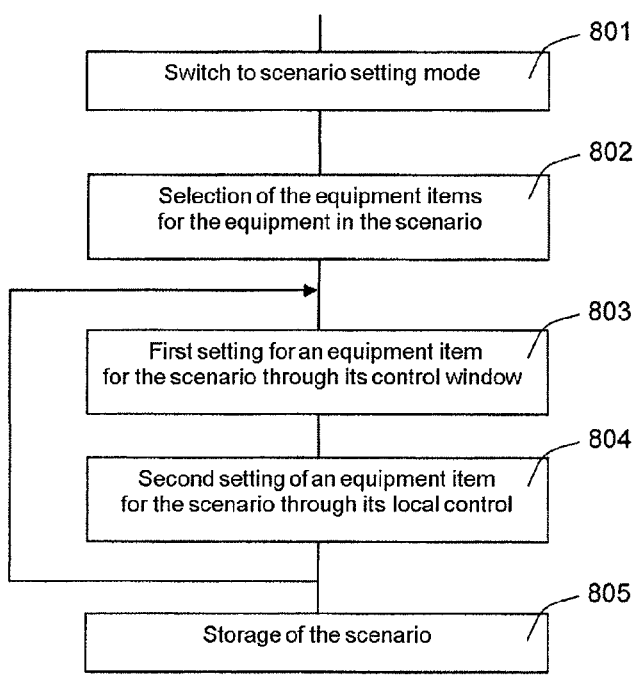
FIG. 8 represents a scenario setting method.

FIG. 8 represents a mode of execution of a method of operation of a home automation system according to the invention offering a mode for setting or configuring a scenario.

In a first step 801, a scenario setting mode is selected, for example following a specific manipulation of the control area 108. A window grouping together the equipment in the scenario is then opened. As in the preceding cases, this window appears in overlay mode, or in a screen portion specially assigned for this use.

In a second step 802, the user selects on the screen the equipment involved in the scenario: each time an equipment item is selected, its equipment icon is duplicated in the grouping window.

In a third step 803, the user opens the control window for an equipment item of the scenario and proceeds to set degrees of orientation and/or of deployment using control buttons, as explained above. The setting is the desired setting on a subsequent execution of the scenario. It may, however, be directly applied to the equipment item, for example by acting on the first control button 603.

In addition or alternatively, in a third step 804, the user uses the specific control means of the equipment item to finely adjust its setting.

The third and/or fourth steps are repeated for the various equipment items in the scenario, then, in a fifth step 805, the scenario is stored, that is to say all the setting parameters are memorized to be transmitted as setpoints on a subsequent execution of the scenario.

Thus, the control device makes it possible to combine, systematically or whenever necessary, both a virtual setting of the equipment item (by modifying the appearance of an icon or of a representation of the equipment) and an actual setting of the latter. The user does not have to choose between a scenario setting mode in which all the equipment items are virtually adjusted and a setting mode in which all the equipment items are actually adjusted. After these adjustments, a step of storing the status of the equipment takes place. This step is like a "snapshot" of the status of the equipment.

Even in the case where the virtual setting using the touch screen leads to the transmission of a command, executed by the equipment item, during the setting phase, it is obvious that the local control of the equipment makes it possible to adjust the setting more finely.

To completely master the scenario setting steps, the user can be compelled to act on an element of the control area 108, for example a fine setting button, to place the control system in a status awaiting new information concerning the actual status of the equipment item selected in the scenario window.

Figure 9:
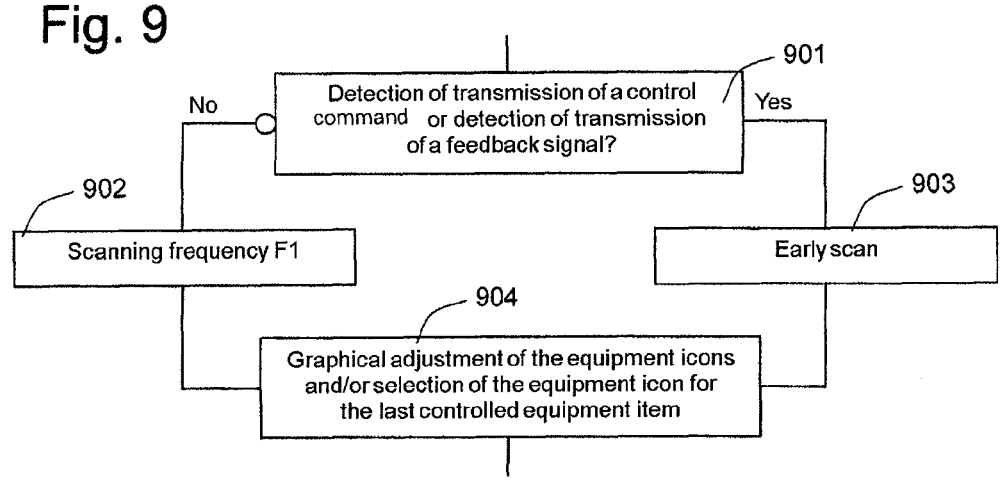
FIG. 9 represents a scanning method making it possible to update and/or select equipment icons.

However, a scanning method, the subject of the invention and whose embodiment is described in FIG. 9, makes it possible to do away with this constraint.

This scanning method is advantageously combined with the operating method and/or the learning method of the invention to ensure that an equipment item is selected rapidly or is at best representative of the actual status of an equipment item.

In a first step 901, the control device 100 is set to permanently listen for communication traffic over the home automation network and it may or may not detect the presence of communication traffic over the home automation network. This is, for example, a step for detection of the transmission of control commands or control command execution information.

In the absence of any signal, a second step 902 is selected, in which the scanning is performed with a first frequency F1.

This means that, at regular intervals (F1 times per unit of time), the control device individually interrogates each actuator to ascertain its current status. Knowing the current status, the control device updates the graphic representations of the equipment items, notably the equipment icons. The interrogation takes place in the form of a succession of individual requests or in the form of a collective request. In this step 902, there is therefore a request addressed to the actuators for the actuators to reply with information on their status.

In the presence of a signal, a third step 903 is selected, in which the scanning is performed early, for example immediately. Thus, the update is almost immediate, but only when it is required. The early scan can be general, that is to say affect all the equipment of the network or be selective, that is to say affect only the equipment involved in the communication traffic over the network. In this step 903, there is a request addressed to the actuators for the actuators to reply with information on their status.

In a fourth step 904, there is, depending on the cases, an update of all the graphic representations of equipment items by modification of their appearances according to the new status or an update of certain graphic representations of equipment items by modification of their appearances according to new status. Complementarily or alternatively, there is a selection of one or more particular equipment icons corresponding to one or more equipment items whose position has just been modified.

The signal used to steer the method towards the second step 902 or the third step 903 is preferentially discriminated so that the step 903 is not initiated by just any communication traffic.

In a first alternative, the third step 903 is applied if the traffic comprises a signal recognized as a control command, sent by a control means.

In a second alternative, the third step 903 is applied if the traffic comprises a signal recognized as being feedback sent by an actuator when a command has been executed.

In a third alternative, the thirst step 903 is applied if the traffic comprises one or other of the preceding signals but addressed to a specific actuator, the one currently selected on the control screen.

Preferentially, the user is informed of the relevance of the current status of the equipment icons. For example, if an update returns with a delay greater than a predetermined duration threshold, adjustable according to the equipment items, then the equipment icon appears dimmed to indicate that there is a doubt. Similarly, information concerning the schedule of the last update can be displayed.

Generally, the method enables a control device 100 possibly using the operating method according to the invention or the learning method according to the invention and communicating over a home automation network with actuators 11, 21, 23, 25, 31, 33, 41, 51 to scan the status of a home automation installation. It comprises a request step 902, 903 addressed to the actuators for the actuators to reply with information on their status, a step 901 for detecting communication traffic over the home automation network, the request step is early 903 when the result of the detection step 901 is positive.

The invention claimed is:

1. A control device for controlling home automation equipment of a building, comprising
    a display screen, in which a first portion of the screen is assigned to the display of type icons,
    a type icon representing a set of home automation equipment of one and the same type, this first portion also being assigned to the display of location icons,
    a location icon representing a set of home automation equipment installed in one and the same place in the building such as a room or a group of rooms,
    wherein an equipment icon can be associated with a type icon and one or more location icons; and
    wherein the control device comprises a first selection or navigation means making it possible to position, in a reduced area of the screen, either a selected type icon or location icon, so as to automatically display in a second portion of the screen equipment icons representative of the home automation equipment assigned to said selected type icon or location icon.

2. The control device according to claim 1, wherein the display screen is also a control screen, for example of touch type, the first navigation means being able to recognize a movement of the finger and the first selection means being able to recognize a contact by the finger.

3. The control device according to claim 1, wherein the icons are arranged on the screen along an open line such as, for example, a segment or an arc of a circle.

4. The control device according to claim 1, wherein the icons are arranged on the screen by spatially grouping the type icons and by spatially grouping the location icons.

5. The control device according to claim 1, wherein a default location icon (ILOC0) separates the type icons from the other location icons.

6. The control device according to claim 5, wherein either all the equipment items are assigned to the default location icon, or only the equipment items not assigned to another location icon are assigned to the default location icon.

7. The control device according to claim 1, wherein an action on the first navigation means or an action on the first selection means results in the movement of a set of icons, in particular a movement of the set of type and location icons.

8. The control device according to claim 1, wherein an action on the first navigation means or an action on the first selection means results in the displacement of a selection index and/or the displacement of the reduced area.

9. The control device according to claim 1, wherein an action on the first navigation means or an action on the first selection means results in an appearance and/or a disappearance of an icon.

10. The control device according to claim 1, wherein the second screen portion comprises a second navigation means and a second selection means acting on the equipment icons.

11. The control device according to claim 1, wherein the selection of an equipment icon results in the opening of a control window for that equipment item.

12. The control device according to claim 1, wherein an equipment icon is representative of the status of the equipment.

13. The control device according to claim 12, wherein the control device comprises means for sending a request addressed to the equipment for the equipment to reply with information on their status and means for detecting the transmission of control commands or control command execution information, means for sending a request being activated early when the detection means detects a transmission of a control command or of control command execution information.

14. The control device according to claim 1, wherein the control device comprises a means of automatic assignnment of an equipment item to an equipment type.

15. A control device for controlling home automation equipment of a building, comprising a display screen in which a first portion of the screen is assigned to the display of type icons, a type icon representing a set of home automation equipment of one and the same type, wherein the control device comprises means for automatically creating and displaying new type icons as new equipment belonging to a new type is recognized in the installation.

16. The control device according to claim 1, wherein the reduced area of the screen is part of the first portion of the display.

\* \* \* \* \*